United States Patent
Baeckler et al.

(10) Patent No.: US 9,544,092 B2
(45) Date of Patent: Jan. 10, 2017

(54) APPARATUS FOR IMPROVED COMMUNICATION AND ASSOCIATED METHODS

(71) Applicant: Altera Corporation, San Jose, CA (US)

(72) Inventors: Gregg William Baeckler, San Jose, CA (US); David W. Mendel, Sunnyvale, CA (US)

(73) Assignee: ALTERA CORPORATION, San Jose, CA (US)

( * ) Notice: Subject to any disclaimer, the term of this patent is extended or adjusted under 35 U.S.C. 154(b) by 209 days.

(21) Appl. No.: 13/799,231

(22) Filed: Mar. 13, 2013

(65) Prior Publication Data

US 2014/0269983 A1    Sep. 18, 2014

(51) Int. Cl.
| | | |
|---|---|---|
| H04K 1/02 | (2006.01) | |
| H04L 1/00 | (2006.01) | |
| H04L 25/02 | (2006.01) | |
| H04L 25/49 | (2006.01) | |

(52) U.S. Cl.
CPC ........... *H04L 1/009* (2013.01); *H04L 25/0284* (2013.01); *H04L 25/4915* (2013.01)

(58) Field of Classification Search
CPC .... H04L 1/0042; H04L 25/4908; H03M 5/145
USPC .......................................... 375/305, 295–297
See application file for complete search history.

(56) References Cited

U.S. PATENT DOCUMENTS

| | | | |
|---|---|---|---|
| 5,022,051 A | | 6/1991 | Crandall et al. |
| 6,026,124 A | * | 2/2000 | Lee et al. ............. 375/292 |
| 6,044,053 A | * | 3/2000 | Ido ................ G11B 20/1426 341/58 |
| 6,897,793 B1 | * | 5/2005 | Kim et al. ................. 341/59 |
| 7,321,259 B1 | * | 1/2008 | Shumarayev ....... H03F 3/45183 327/307 |
| 7,676,733 B2 | * | 3/2010 | Ganga et al. ............. 714/775 |
| 7,782,805 B1 | | 8/2010 | Belhadj et al. |
| 8,325,850 B2 | | 12/2012 | Zheng et al. |
| 2005/0229049 A1 | * | 10/2005 | Collins ................ H04L 25/14 714/699 |
| 2007/0041455 A1 | * | 2/2007 | Tran ............... H04L 25/03878 375/257 |
| 2009/0179923 A1 | * | 7/2009 | Amundson ............ G02F 1/167 345/690 |
| 2009/0267970 A1 | * | 10/2009 | Wong ..................... G09G 3/344 345/690 |
| 2010/0219996 A1 | * | 9/2010 | Abel ..................... H04L 25/061 341/120 |
| 2015/0194111 A1 | * | 7/2015 | Slavenburg .......... G09G 3/3618 345/209 |

(Continued)

OTHER PUBLICATIONS

*Scalable Serdes Framer Interface (SFI-S): Implementation Agreement for Interfaces beyond 40G for Physical Layer Device*, Optical Internetworking Forum, 32 pp. (Nov. 2008), available at www.oiforum.com/public/documents/OIF_SFI-S_01.0_IA.pdf.

(Continued)

*Primary Examiner* — Qutbuddin Ghulamali

(57) ABSTRACT

An apparatus includes a transmitter adapted to transmit encoded information to a communication link. The transmitter includes a DC balance skew generator. The DC balance skew generator is adapted to skew a DC balance of the information before information is provided to the communication link.

20 Claims, 12 Drawing Sheets

(56) References Cited

U.S. PATENT DOCUMENTS

2015/0243234 A1* 8/2015 Bloks .................. G09G 3/3614
    345/96

OTHER PUBLICATIONS

*Serdes Framer Interface Level 5 (SFI-5): Implementation Agreement for 40Gb/s Interface for Physical Layer Devices*, Optical Internetworking Forum, 62 pp. (Jan. 2002), available at www.oiforum.com/public/documents/OIF-SFI5-01.0.pdf.
*Interlaken Protocol Definition, A Joint Specification of Cortina Systems and Cisco Systems*, Rev. 1.2, 52 pp. (Oct. 7, 2008), available at www.interlakenalliance.com/Interlaken_Protocol_Definition_v1.2.pdf.
Sowmya S. Luckoor, *Introduction to 10 Gigabit 64b/66b (Clause 49)*, 30 pp. (Oct. 22, 2001), available at www.iol.unh.edu/services/testing/10gec/training/10GbE_C149.pdf.
Rick Walker et al., *64b/66b coding update*, 19 pp. (Mar. 6, 2000), available at www.omnisterra.com/walker/pdfs.talks/albuquerque.pdf.
Svilen Dimitrov et al., "Signal Shaping and Modulation for Optical Wireless Communication," 30 J. Of Lightwave Technology 1319-28 (2012).

* cited by examiner

| 1 | 1 | 0 | 0 | 0 | 1 | 1 | 0 |

Fig. 5

| 1 | 1 | 1 | 0 | 0 | 1 | 1 | 0 |

Fig. 6

APPARATUS FOR IMPROVED COMMUNICATION AND ASSOCIATED METHODS

TECHNICAL FIELD

The disclosed concepts relate generally to electronic communication and, more particularly, to apparatus for improving encoding performance in communication by using a skewed, adjusted, or controlled DC balance, and associated methods.

BACKGROUND

Electronic circuitry and systems sometimes use a high speed link to facilitate communication between two circuits or subsystems. The link, which might be a serial link, may communicate information or data with encoding added by a transmitter that may indicate word-boundaries, distinguish data and control information, scramble the data to spread out electromagnetic interference (EMI), avoid long run-lengths, and balance the number of zeros and ones to avoid a DC imbalance. Examples of encoding schemes include 8$b$10$b$, 64/66, 128$b$/130$b$, and 64/67, which are well known to persons of ordinary skill in the art.

At the receiver, the data communicated via the link are processed to determine word boundary, obtain lock with the transmitter, decode, etc. Once word lock is found, the data transitions are used to confirm that word-lock is maintained. The details of those operations are well known to persons of ordinary skill in the art.

SUMMARY

A variety of apparatus and related methods are contemplated for improving communication using DC balance skew. In one exemplary embodiment, an apparatus includes a transmitter adapted to transmit encoded information to a communication link. The transmitter includes a DC balance skew generator. The DC balance skew generator is adapted to skew a DC balance of the information before information is provided to the communication link.

According to another exemplary embodiment, an apparatus includes a transmitter adapted to transmit information, where the transmitter includes a transmit physical coding sublayer (PCS) circuit that includes a DC balance skew generator to cause DC imbalance in the information. The transmitter also includes a transmit physical media attachment (PMA) circuit coupled to the transmit PCS circuit. The transmit PMA is adapted to provide the information to a communication link.

According to yet another exemplary embodiment, a method of communicating information includes obtaining the information, and adding DC balance skew to the information. The method further includes transmitting the information via a communication link.

BRIEF DESCRIPTION OF THE DRAWINGS

The appended drawings illustrate only exemplary embodiments and therefore should not be considered as limiting its scope. Persons of ordinary skill in the art who have the benefit of this disclosure appreciate that the disclosed concepts lend themselves to other equally effective embodiments. In the drawings, the same numeral designators used in more than one drawing denote the same, similar, or equivalent functionality, components, or blocks.

FIG. 5 depicts a bit stream with a zero running disparity for use in an exemplary embodiment.

FIG. 6 shows a bit stream with a non-zero running disparity as a result of applying DC balance skew according to an exemplary embodiment.

DETAILED DESCRIPTION

The disclosed concepts relate generally to improved communication in electronic circuitry or systems by skewing (or adjusting, configuring, setting, and/or controlling) the DC bias. More specifically, as described below in detail, the disclosed concepts provide apparatus and methods for a variety of data communication schemes where skewing the DC bias improves the communication, for example, increased reliability, reduced error rate, etc. The disclosed concepts may be used with a variety of communication circuitry and encoding schemes.

Modern high-speed communication often uses digital signals to communicate information or data. Such an arrangement might be used, for example, to communicate information over a backplane using a stream of 1s and 0s. For a variety of reasons, well understood to persons of ordinary skill in the art, in conventional communication systems, maintaining DC balance is a desired attribute.

Generally, DC balance refers to encoding of the stream of data so that the running disparity (RD) of the data communicated is minimized or eliminated. Running disparity is a measure of the imbalance between 0s and 1s. For example, a transmission that includes 450 0s and 550 1s has a running disparity of +100, and an imbalance of (100/1000)×100%, or 10%.

Run-length is a measure of a series of consecutive 0s or 1s in communicated data. Longer run-length sequences are usually more challenging for a typical receiver to properly detect. Shorter run-lengths allow successful communication over longer distances, for example, over a 20" backplane, rather than a 10" backplane (as might be the case with longer run-lengths). As a result of shorter run-lengths, typical high speed links work better over challenging connections, such as a backplane.

In typical high-speed communication systems, the transmitter and/or receiver couple to the channel via an AC coupling mechanism or network, for example, through capacitor(s). DC balance may be viewed as running disparity filtered through the AC-coupling network.

In conventional communication apparatus, maintaining an equal balance of the 1s and 0s communicated via a channel, e.g., the backplane mentioned above, has been deemed desirable and perhaps even necessary for proper operation. For example, 8b10b encoding guarantees running disparity balance. As another example, 64/66 (Ethernet) encoding provides statistical balance.

The inventors of this application, however, have discovered that skewing the DC balance may improve the communication over a channel or link. In other words, intentionally introduced DC imbalance may improve communication over the channel or link. The discovery is an unexpected result, especially in light of the conventional emphasis or requirement for DC balance.

Figure 1:
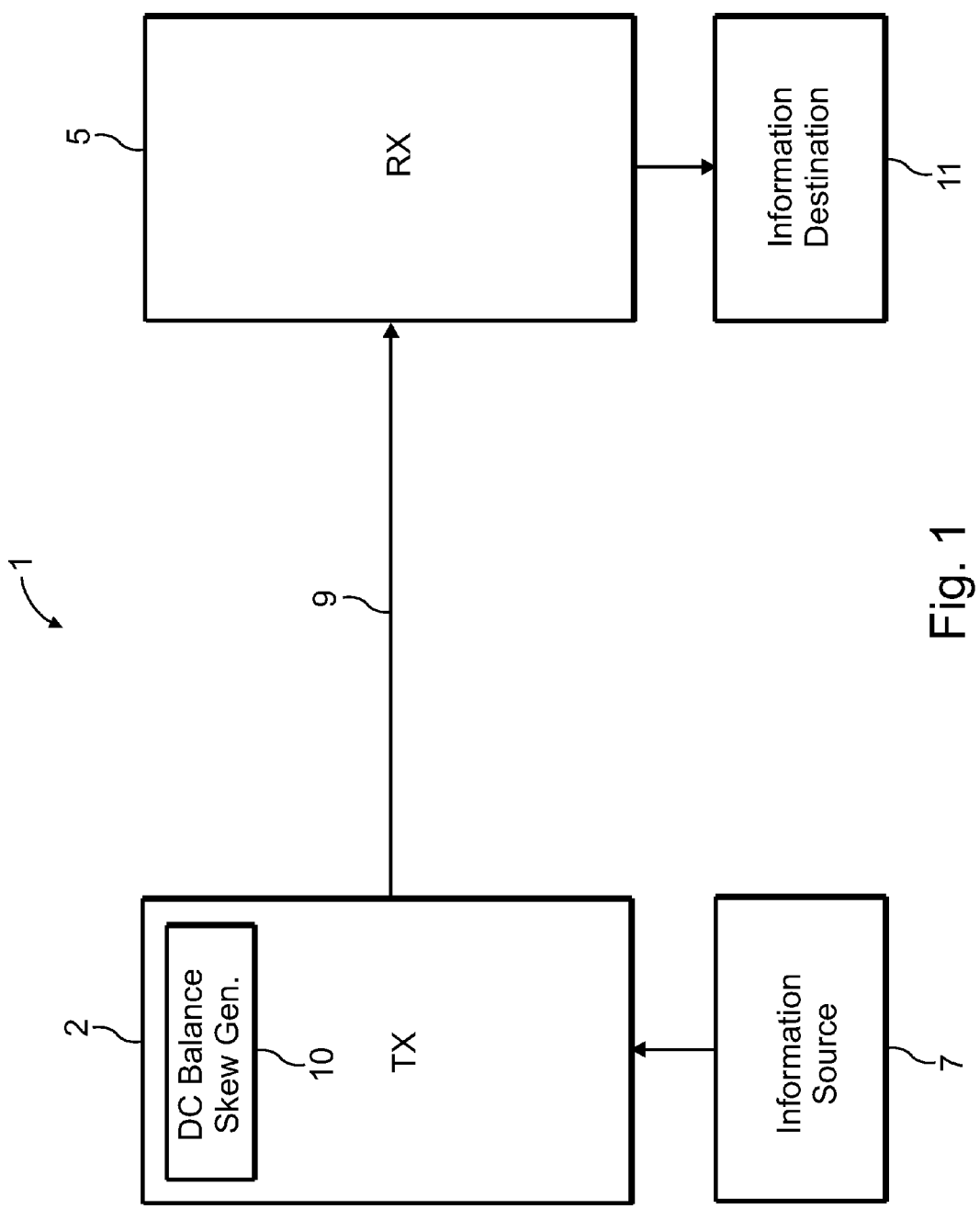
FIG. 1 illustrates a block diagram of an arrangement for communicating information or data according to an exemplary embodiment.

FIG. 1 illustrates a block diagram of an arrangement 1 for communicating information or data according to an exemplary embodiment. The arrangement includes a transmitter 2 coupled to a receiver 5 via link 9. In some exemplary embodiments, transmitter 2 may reside in the same physical enclosure or package as receiver 5. As one example, transmitter 2 and receiver 5 may reside within a rack-mounted system or instrument. As another example, transmitter 2 and receiver 5 may reside on separate dies (or the same die) within a multi-chip module (MCM). As yet another example, transmitter 2 and receiver 5 may reside on the same die within an integrated circuit (IC).

In some exemplary embodiments, transmitter 2 may reside in a different physical enclosure or package than receiver 5. As an example, transmitter 2 may reside in a different physical enclosure or package that couples via a backplane to a physical enclosure or package that houses or includes receiver 5. As another example, transmitter 2 may reside in a different physical enclosure or package that couples via a cable, optical fiber, or other mechanism to a physical enclosure or package that houses or includes receiver 5.

Transmitter 2 receives information from a source 7. Typically, transmitter 2 performs one or more operations on the information before transmission to receiver 5. As part of those operations, transmitter 2 uses DC balance skew generator 10 to skew the DC balance of the information (cause a DC imbalance), such as a stream or set of digital bits. Transmitter 2 provides the results of the operations, including the DC balance skew, to receiver 5 via link 9.

Receiver 5 receives the information from link 118. Receiver 5 may perform one or more operations on the received information. Receiver 5 provides the results of those operations to information destination 11. Information destination 11 may include circuitry or a subsystem that ultimately (or as an intermediate destination) receives and/or uses the information.

Link 9 may have a variety of forms. Generally, link 6 includes one or more coupling mechanisms, such as wires, cables, printed-circuit board (PCB) traces, conductors or semiconductors in ICs, MCMs, and the like, to facilitate the communication of information or data, status, and/or control signals. In exemplary embodiments, transmitter 2 uses serial communication to provide the encoded data to receiver 5. As persons of ordinary skill in the art would understand, however, one may use other communication protocols, or schemes, such as parallel communication, or use other coupling mechanisms between transmitter 2 and receiver 5.

Figure 2:
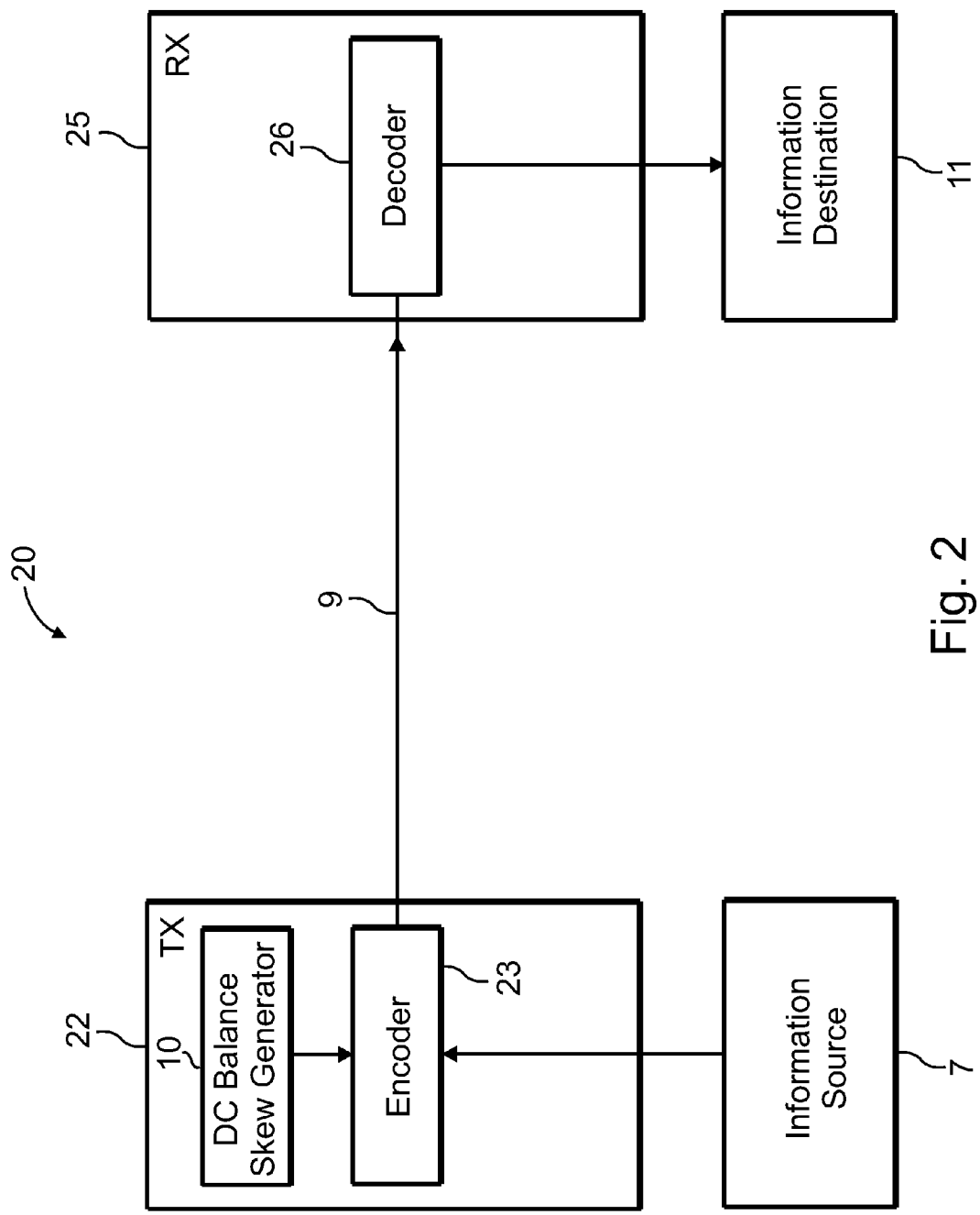
FIG. 2 depicts a block diagram of an arrangement for communicating information or data according to another exemplary embodiment.

FIG. 2 depicts a block diagram of an arrangement 20 for communicating information or data according to another exemplary embodiment. The arrangement includes a transmitter 22 coupled to a receiver 25 via link 9. In some exemplary embodiments, transmitter 22 may reside in the same physical enclosure or package as receiver 25. As one example, transmitter 22 and receiver 25 may reside within a rack-mounted system or instrument. As another example, transmitter 22 and receiver 25 may reside on separate dies (or the same die) within an MCM. As yet another example, transmitter 22 and receiver 25 may reside on the same die within an IC.

Other physical arrangements than shown in FIG. 2 may be used, as desired. For example, in some exemplary embodiments, transmitter 22 may reside in a different physical enclosure or package than receiver 25. As an example, transmitter 22 may reside in a different physical enclosure or package that couples via a backplane to a physical enclosure or package that houses or includes receiver 25. As another example, transmitter 22 may reside in a different physical enclosure or package that couples via a cable, optical fiber, or other mechanism to a physical enclosure or package that houses or includes receiver 25.

Transmitter 22 receives information from a source 7. Typically, transmitter 22 performs one or more operations on the information before transmission to receiver 25. In the embodiment shown, encoder 23 performs encoding operations on the information although, in addition or instead of encoding, other operations (e.g., pre-emphasis) may be performed in other embodiments. A variety of encoding schemes may be used, as persons of ordinary skill in the art understand. Without limitation, encoding examples include 8b10b, 64/66, 128b/130b, and 64/67.

In addition, transmitter 22 uses DC balance skew generator 10 to skew the DC balance of the information, such as a stream or set of digital bits. Transmitter 22 provides the results of the operations, including the DC balance skew operation, to receiver 25 via link 9.

Receiver 25 receives the information from link 9. Receiver 25 may perform one or more operations on the received information. In the embodiment shown, decoder 26 performs decoding operations on the information although, in addition or instead of decoding, other operations (e.g., equalization) may be performed in other embodiments. A variety of decoding schemes may be used, as persons of ordinary skill in the art understand. Without limitation, encoding examples include 8b10b, 64/66, 128b/130b, and 64/67. Receiver 25 provides the results of those operations to information destination 11. As noted above, information destination 11 may include circuitry or a subsystem that ultimately (or as an intermediate destination) receives and/or uses the information.

In some embodiments, the transmitter and/or receiver may be implemented as parts of systems or subsystems. As such, the transmitter may be part of a physical layer (PHY). The PHY layer may include the circuitry for automatically configuring various settings for the desired communication protocols. The PHY layer may include or use a modular design.

Figure 3:
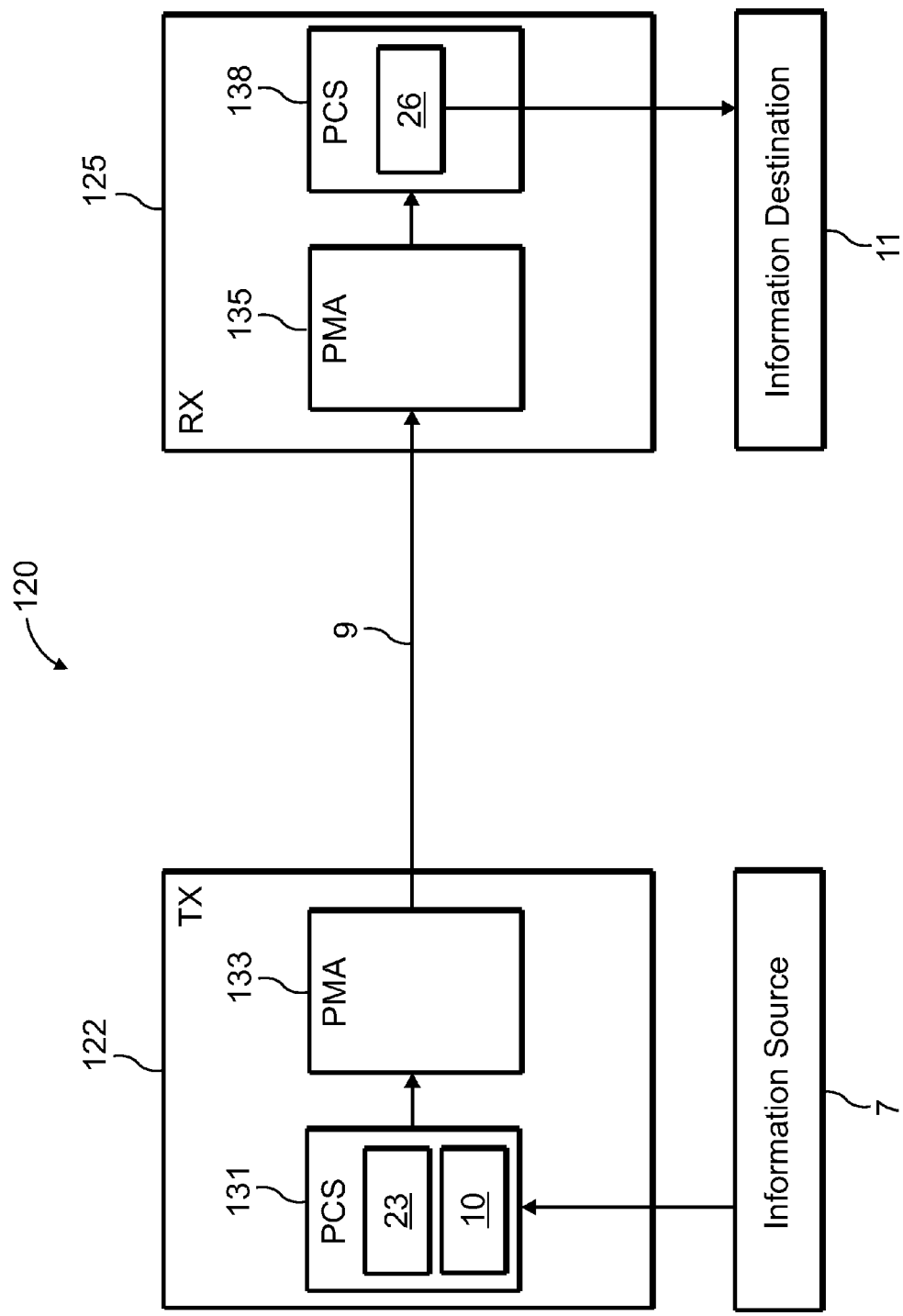
FIG. 3 shows a block diagram of an arrangement for communicating information or data according to another exemplary embodiment.

FIG. 3 depicts a block diagram of an arrangement 50 for communicating information or data according to another exemplary embodiment. In this arrangement, the transmitter and receiver PHY include physical coding sublayer (PCS) and physical media attachment (PMA).

Referring to FIG. 3, transmitter 122 couples to receiver 125 via link 9. In some exemplary embodiments, transmitter 122 may reside in the same physical enclosure or package as receiver 125. As one example, transmitter 122 and receiver 125 may reside within a rack-mounted system or instrument. As another example, transmitter 122 and receiver 125 may reside on separate dies (or the same die) within an MCM. As yet another example, transmitter 122 and receiver 125 may reside on the same die within an IC.

Other physical arrangements than shown in FIG. 3 may be used, as desired. For example, in some exemplary embodiments, transmitter 122 may reside in a different physical enclosure or package than receiver 125. As an example, transmitter 122 may reside in a different physical enclosure or package that couples via a backplane to a physical enclosure or package that houses or includes receiver 125. As another example, transmitter 122 may reside in a different physical enclosure or package that couples via a cable, optical fiber, or other mechanism to a physical enclosure or package that houses or includes receiver 125.

Transmitter 122 includes PCS 131 and PMA 133. Transmitter 122 receives information from a source 7 via PCS 131. Typically, transmitter 122 performs one or more operations on the information before transmission to receiver 125. In the embodiment shown, encoder 23 performs encoding operations on the information although, in addition or instead of encoding, other operations may be performed in other embodiments, as persons of ordinary skill in the art understand.

A variety of encoding schemes may be used, as persons of ordinary skill in the art understand. Without limitation, encoding examples include 8*b*10*b*, 64/66, 128*b*/130*b*, and 64/67. In addition, PCS 131 may also support clock compensation, rate matching, word alignment, error monitoring, phase compensation, and/or scrambling and de-scrambling, as desired.

In addition, the circuitry in PCS 131 includes DC balance skew generator 10. PCS 131 uses DC balance skew generator 10 circuitry to skew the DC balance of the information, such as a stream or set of digital bits. Transmitter 122 provides the results of the operations, including the DC balance skew operation, to PMA 133.

PMA 133 may further process the information received from PCS 131. For example, PMA 133 may serialize the information in order to use a serial communication channel or link. PMA 133 provides the processed information to receiver 125 via link 9. PMA 133 may provide other functionality, such as programmable output differential voltage (VOD), programmable pre-emphasis, etc., as desired.

In addition to the circuitry/blocks shown, transmitter 122 may include other circuits or blocks, as desired. For example, transmitter 122 may include one or more controllers to control or supervise the operation of various parts of transmitter 122, such as PCS 131 and PMA 133.

Receiver 125 receives the information from link 9. Typically, receiver 125 performs one or more operations on the information. Receiver 125 includes PCS 135 and PMA 138. Receiver 125 receives information from link 9 via PMA 135. PMA 135 may process the received information, for example, by deserliazing the information (when link 9 constitutes a serial communication link). PMA 135 may perform a variety of functions, such as offset cancellation (which corrects or tends to correct for semiconductor fabrication process variation), programmable equalization, etc., as desired. PMA 135 provides the processed information to PCS 138.

PCS 138 may process the information in a variety of ways, for example, by decoding the information. In the embodiment shown, decoder 26 performs decoding operations on the information received from PMA 138 although, in addition or instead of decoding, other operations may be performed in other embodiments.

A variety of decoding schemes may be used, as persons of ordinary skill in the art understand. Without limitation, encoding examples include 8*b*10*b*, 64/66, 128*b*/130*b*, and 64/67. Receiver 125 provides the results of those operations to information destination 11. As noted above, information destination 11 may include circuitry or a subsystem that ultimately (or as an intermediate destination) receives and/or uses the information.

In addition to the circuitry/blocks shown, receiver 125 may include other circuits or blocks, as desired. For example, receiver 125 may include one or more controllers to control or supervise the operation of various parts of receiver 125, such as PMA 135 and PCS 138.

Figure 4A:
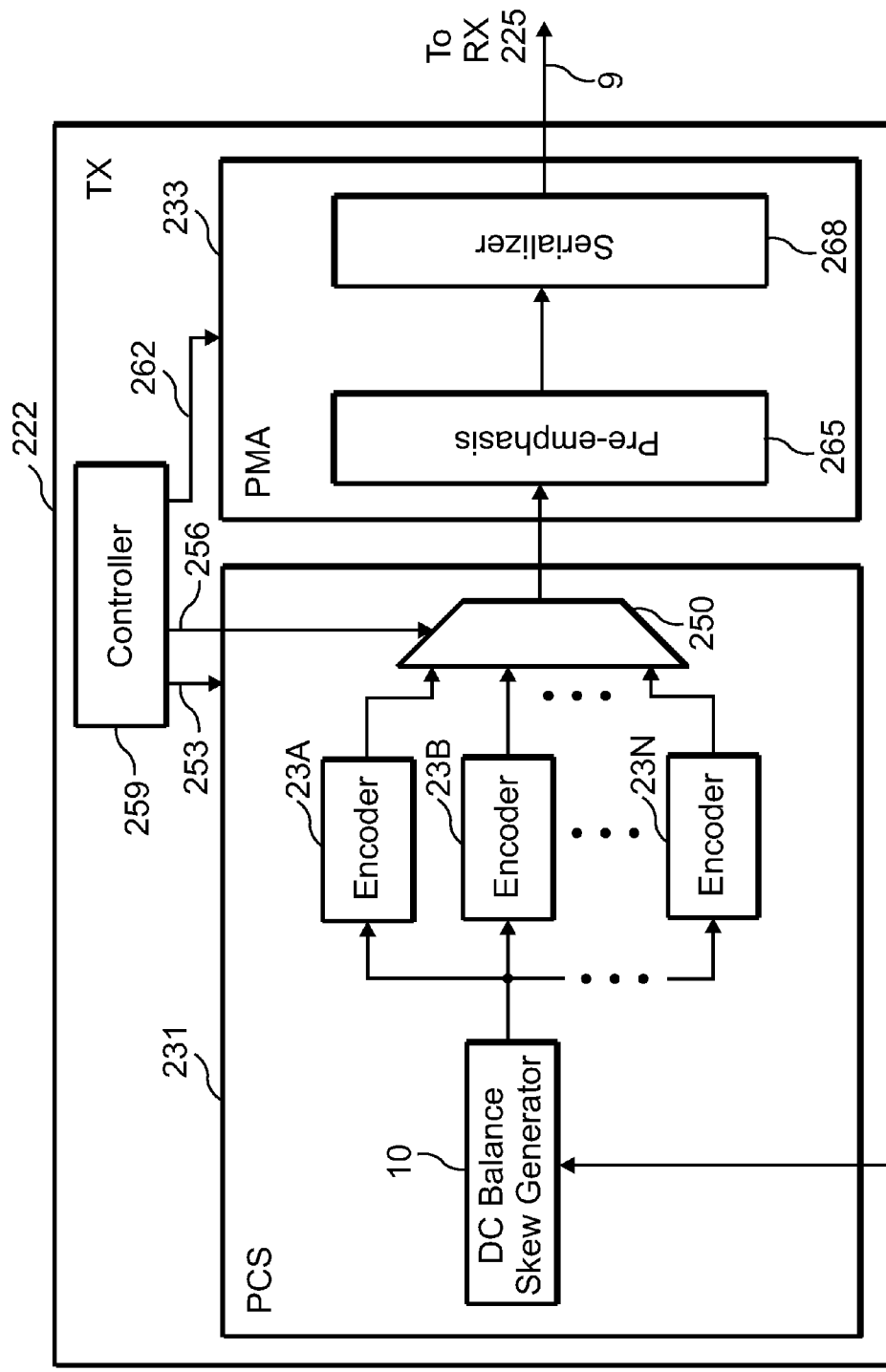
FIGS. 4A-4B illustrate block diagrams of arrangements for communicating information or data according to another exemplary embodiment.
Figure 4B:
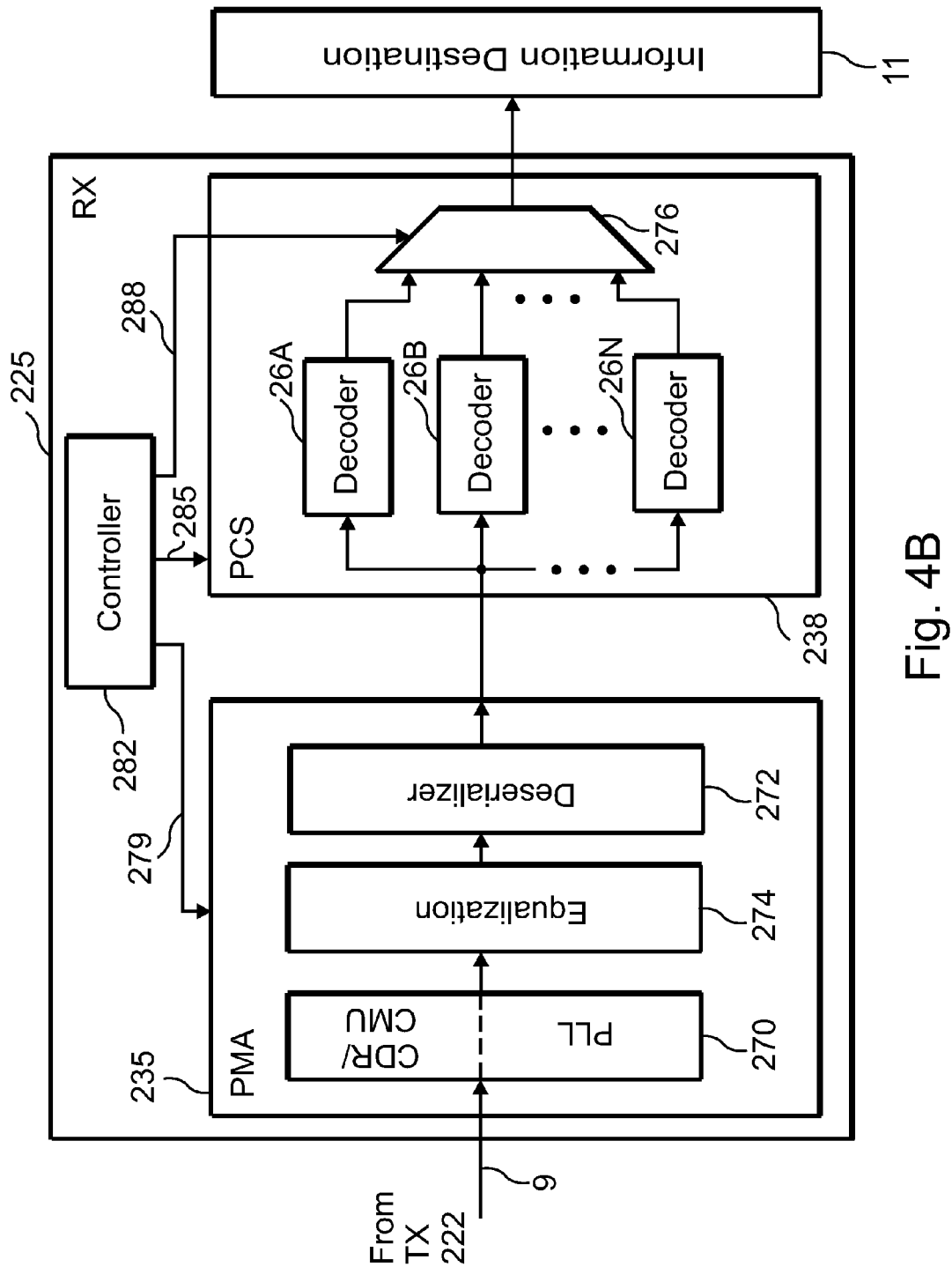

Other configurations or arrangements for the PHY layer generally, and for PCS and PMA specifically, may be used in various embodiments. FIGS. 4A and 4B illustrate block diagrams of arrangements for communicating information or data according to another exemplary embodiment.

FIG. 4A depicts a block diagram of a transmitter 222 for communicating information or data according to an exemplary embodiment. In this arrangement, the PHY layer of transmitter 222 includes PCS 231 and PMA 233. Transmitter 222 receives information from a source 7 via PCS 231.

Typically, transmitter 222 performs one or more operations on the information before transmission to receiver 225 (see FIG. 4B). Referring to FIG. 4A, the circuitry in PCS 231 includes DC balance skew generator 10. PCS 231 uses DC balance skew generator 10 circuitry to skew the DC balance of the information, such as a stream or set of digital bits. In the embodiment shown, DC balance skew generator 10 provides the information with skewed DC balance to encoders 23A-23N.

In the embodiment shown, encoders 23A-23N perform, respectively, encoding operations 1-N on the information (although, in addition or instead of encoding, other operations may be performed in other embodiments, as persons of ordinary skill in the art understand). More specifically, encoder 23A may encode the information using one type of encoding, encoder 23B may encode the information using a different type of encoding, and so on to encoder 23N. A variety of encoding schemes may be used, as persons of ordinary skill in the art understand. Without limitation, encoding examples include 8*b*10*b*, 64/66, 128*b*/130*b*, and 64/67.

The results of the encoding operations are provided to multiplexer (MUX) 250. In response to control signal(s) 256 from controller 259, MUX 250 selects information encoded with a desired coding scheme, and provides the encoded information to PMA 233. Controller 259 uses signals 253 to control other operations of PCS 231. In addition to the operations described above, PCS 231 may also support clock compensation, rate matching, word alignment, error monitoring, phase compensation, and/or scrambling and de-scrambling, as desired.

PMA 233 may further process the information received from PCS 231, in response to control signals 262 from controller 259. PMA 233 may use pre-emphasis circuit 265 to pre-emphasize the information, as persons of ordinary skill in the art understand. In some embodiments, pre-emphasis circuit 265 may be programmable, for example, under the control of controller 259.

PMA 233 may also serialize the information in order to use a serial communication channel or link. In the embodiment shown, PMA 233 uses serializer circuit 268 to do so. PMA 233 provides the processed information to receiver 225 (see FIG. 4B) via link 9. Referring back to FIG. 4A, PMA 133 may provide other functionality, such as programmable output differential voltage (VOD), etc., as desired.

FIG. 4B depicts a block diagram of a receiver 225 for communicating information or data according to an exemplary embodiment. In this arrangement, the PHY layer of receiver 225 includes PMA 235 and PCS 238. Receiver 225 receives the information from link 9. Typically, receiver 225 performs one or more operations on the information, for example, as described below.

Receiver 225 receives information from link 9 via PMA 235. In the embodiment shown, PMA 235 includes a signal generation circuit 270, which generates signals used to process information in receiver 225, and to provide the resulting information to deserializer 272. Signal generation circuit may include a phase locked loop (PLL) circuit. Signal generation circuit 270 may also include a clock data recovery (CDR) circuit and/or a clock multiplier unit (CMU), as desired. The details of operation of the PLL, CDR, and CMU circuits fall within the knowledge of persons of ordinary skill in the art.

Equalization circuit 274 may provide equalization to the information, as persons of ordinary skill in the art understand. In some embodiments, equalization circuit 274 may be programmable, for example, via control signal(s) 279, under the control of controller 282. PMA 235 may perform a variety of functions, such as offset cancellation (which corrects or tends to correct for semiconductor fabrication process variation), etc., as desired. PMA 235 provides the processed information to PCS 238. Deserializer 272 converts the information from serial to parallel form.

PCS 238 may perform a variety of information processing tasks, such as decoding. In the embodiment shown, decoders 26A-26N perform, respectively, decoding operations 1-N on the information (although, in addition or instead of encoding, other operations may be performed in other embodiments, as persons of ordinary skill in the art understand). More specifically, decoder 26A may decode the information using one type of decoding, decoder 26B may decode the information using a different type of decoding, and so on to decoder 26N. A variety of decoding schemes may be used, as persons of ordinary skill in the art understand. Without limitation, encoding examples include 8$b$10$b$, 64/66, 128$b$/130$b$, and 64/67.

The results of the decoding operations are provided to multiplexer (MUX) 276. In response to control signal(s) 288 from controller 282, MUX 276 selects information decoded with a desired decoding scheme, and provides the decoded information to information destination circuit 11. Controller 282 uses signals 285 to control other operations of PCS 238. In addition to the operations described above, PCS 238 may also support clock compensation, rate matching, word alignment, error monitoring, phase compensation, and/or scrambling and de-scrambling, as desired.

In some exemplary embodiments, transmitter 222 may reside in the same physical enclosure or package as receiver 225. As one example, transmitter 222 and receiver 225 may reside within a rack-mounted system or instrument. As another example, transmitter 222 and receiver 225 may reside on separate dies (or the same die) within an MCM. As yet another example, transmitter 222 and receiver 225 may reside on the same die within an IC.

Other physical arrangements than shown in FIGS. 4A-4B may be used, as desired. For example, in some exemplary embodiments, transmitter 222 may reside in a different physical enclosure or package than receiver 225. As an example, transmitter 222 may reside in a different physical enclosure or package that couples via a backplane to a physical enclosure or package that houses or includes receiver 225. As another example, transmitter 222 may reside in a different physical enclosure or package that couples via a cable, optical fiber, or other mechanism to a physical enclosure or package that houses or includes receiver 225.

As persons of ordinary skill in the art understand, a variety of modifications or variations to the arrangements shown in FIGS. 1-4 are contemplated and may be used. For example, rather than use transmitters and/or receivers as shown in FIGS. 1-4, one may use transceivers. In such arrangements, a transceiver would include circuitry for transmitting information to another transceiver (or receiver) and circuitry for receiving information from another transceiver (or transmitter), as desired. Put another way, the circuitry and/or functionality of a transmitter may be combined with that of a receiver to realize a transceiver. One may use DC balance skew in any of such configurations, as desired.

Furthermore, the receiver (or the receiving transceiver) not necessarily be aware or be made aware of the DC balance skew in order to realize improved communication. As long as the receiver or transceiver can process the information including the skewed DC balance, the techniques and apparatus described in this document may be applied.

The DC balance skew techniques may also be applied to existing coding schemes. For example, existing Interlaken 64/67 links could be modified to have a DC imbalance (i.e., introduce a DC balance skew) without changes to the corresponding receiver or transceiver. As another example, some 8B10B protocols could be modified by, for example, making changes to the receiver to ignore running disparity errors that would result from the DC balance skew operation.

Figures 5, 6:
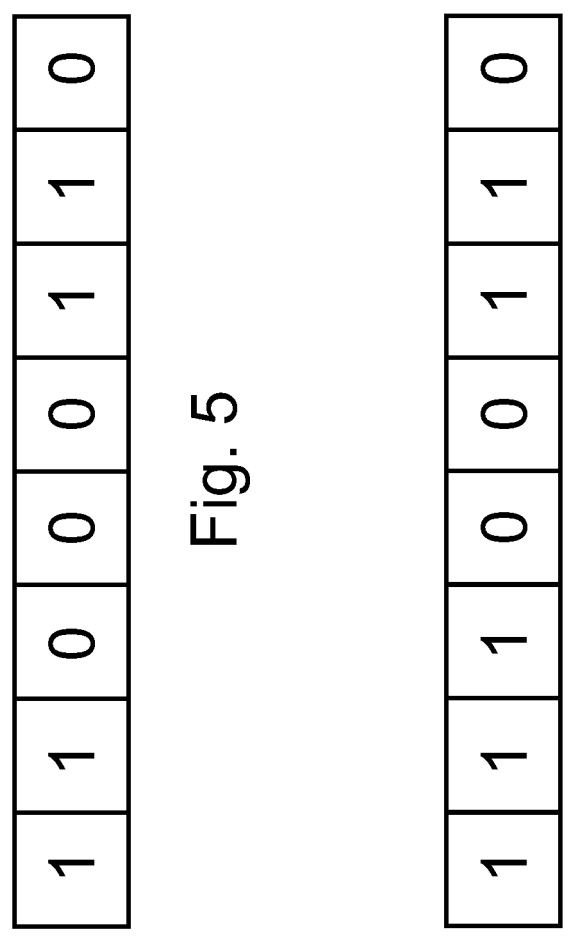

Applying or using DC balance skew causes a change in the running disparity, as FIGS. 5-6 illustrate. FIG. 5 shows a bit stream with a zero running disparity for use in an exemplary embodiment. The bit stream in FIG. 5 includes four binary 1s, and four binary zeros. In other words, the bit stream has a zero running disparity. Over time, transmission of such bit streams results in DC balance in the link.

As noted, the disclosed apparatus and techniques intentionally apply or cause a DC imbalance, i.e., a DC balance skew. FIG. 6 shows a bit stream with a non-zero running disparity as a result of applying DC balance skew according to an exemplary embodiment. More specifically, by applying DC balance skew to the bit stream of FIG. 5, one may produce the bit stream of FIG. 6. The bit stream of FIG. 6 includes five binary 1s, but three binary 0s. Consequently, the bit stream has a non-zero running disparity, i.e., includes DC balance skew.

Applying DC balance skew may improve one or more characteristics, metrics, figures or merit, or measures of the communication link or communication quality. For example, DC balance skew may improve the bit error rate (BER). As a result, the communication over a link that includes DC balance skew can improve.

In some embodiments, information may be obtained regarding the quality of communication, e.g., the effect of DC balance skew. Such information may be used to modify the amount of DC balance skew. Effectively, such information may be used to form a feedback loop that seeks to improve, modify, or optimize the DC balance skew. Such a technique may be used with the arrangements shown in FIGS. 1-4.

For example, in some embodiments, one transceiver may provide information to a transceiver at the other end of the communication link information about the communication BER. In response, the transmitting transceiver may decide whether to apply or use DC balance skew and, if so, how much DC balance skew to use or apply. The operations may be repeated, as desired.

Figure 7:
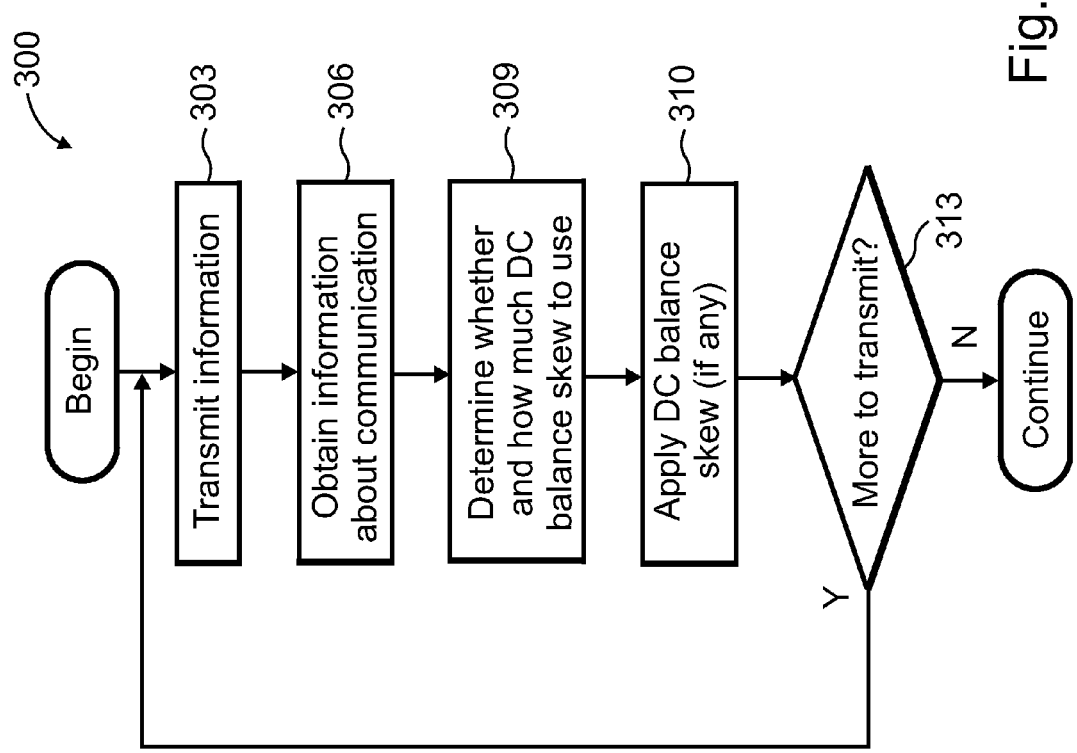
FIG. 7 illustrates a flow diagram of a method according to an illustrative embodiment for using DC balance skew.

FIG. 7 shows a flow diagram 300 of a method according to an illustrative embodiment that uses this technique. At 303, transmission or communication of information commences. At 306, information about the transmission or communication is obtained, for example, BER. At 309, a determination is made whether to use DC balance skew and, if so, how much or to what extent or amount to skew the DC balance.

At 310, the DC balance skew, if any, is applied. At 313, a determination is made whether additional information exists for transmission or whether further communication is desired. If so, control returns to 303. Otherwise, communication ends.

Note that the information exchange about the link or communication or transmission may take place in a variety of ways. For example, the communication link itself may be used, and the transceivers may use special symbols or protocols to exchange information. As another example, one or more extra coupling mechanisms, for instance, wires, may be used to allow communication about the link or transmission quality.

Note that the information exchange about the link or communication or transmission may take place in a variety of ways. For example, the communication link itself may be used, and the transceivers may use special symbols or protocols to exchange information. As another example, one or more extra coupling mechanisms, for instance, wires, may be used to allow communication about the link or transmission quality.

In some embodiments, a transceiver at one end of the communication link may determine the quality of communication by monitoring the activities of a transceiver at the other end of the communication link. For instance, by monitoring the number or frequency of requests by the receiving transceiver to re-transmit information (e.g., because of errors), the transmitting transceiver may determine the quality of the communication link, e.g., BER. In response, the transmitting transceiver may decide whether to apply or use DC balance skew and, if so, how much DC balance skew to use or apply.

Figure 8:
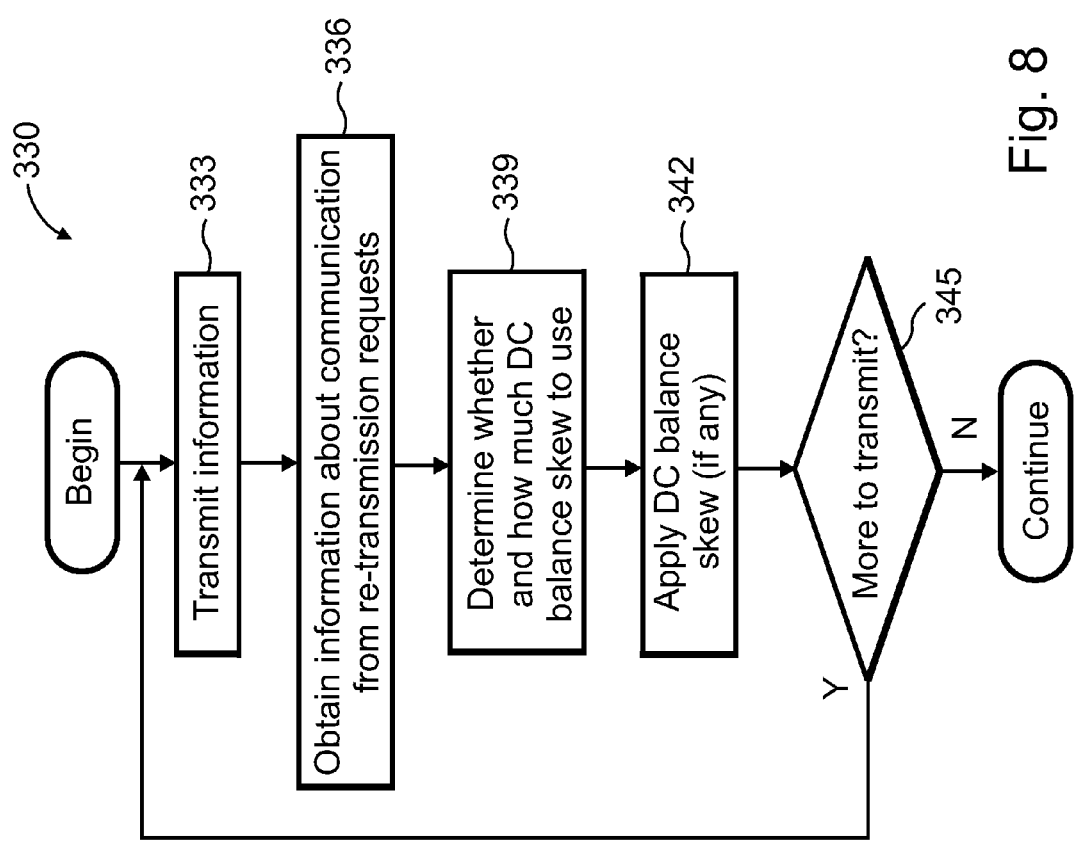
FIG. 8 depicts a flow diagram of a method according to an illustrative embodiment for using DC balance skew.

FIG. 8 shows a flow diagram 330 of a method according to an illustrative embodiment that uses the above technique. At 333, transmission or communication of information commences. At 336, information, for example, BER, about the transmission or communication is obtained or estimated by monitoring the communication link or from re-transmission request numbers or frequency.

At 339, a determination is made whether to use DC balance skew and, if so, how much or to what extent or amount to skew the DC balance. At 342, the DC balance skew, if any, is applied. At 345, a determination is made whether additional information exists for transmission or whether further communication is desired. If so, control returns to 333. Otherwise, communication ends.

In some embodiments, a preset or pre-determined amount of DC balance skew may be used. For example, in some transmitters or transceivers, a level or amount of DC imbalance or DC balance skew may be determined based on the anticipated or actual communication link and stored or coded in the transmitters or transceivers. During operation, DC balance skew may be used according to the stored or coded value.

As another example, the stored or coded level or amount of DC balance skew may depend on factors such as semiconductor fabrication process variations. Thus, during or after manufacture of an IC, the die or circuitry may be characterized to determine various characteristics of the fabricated integrated circuitry. One or more amounts or levels of DC balance skew may be selected, calculated, or determined based on the characterization. The amounts or levels of DC balance skew may be coded or stored (e.g., in non-volatile memory, via fuses, etc.) in the IC for use during the operation of the integrated transmitter or transceiver.

Figure 9:
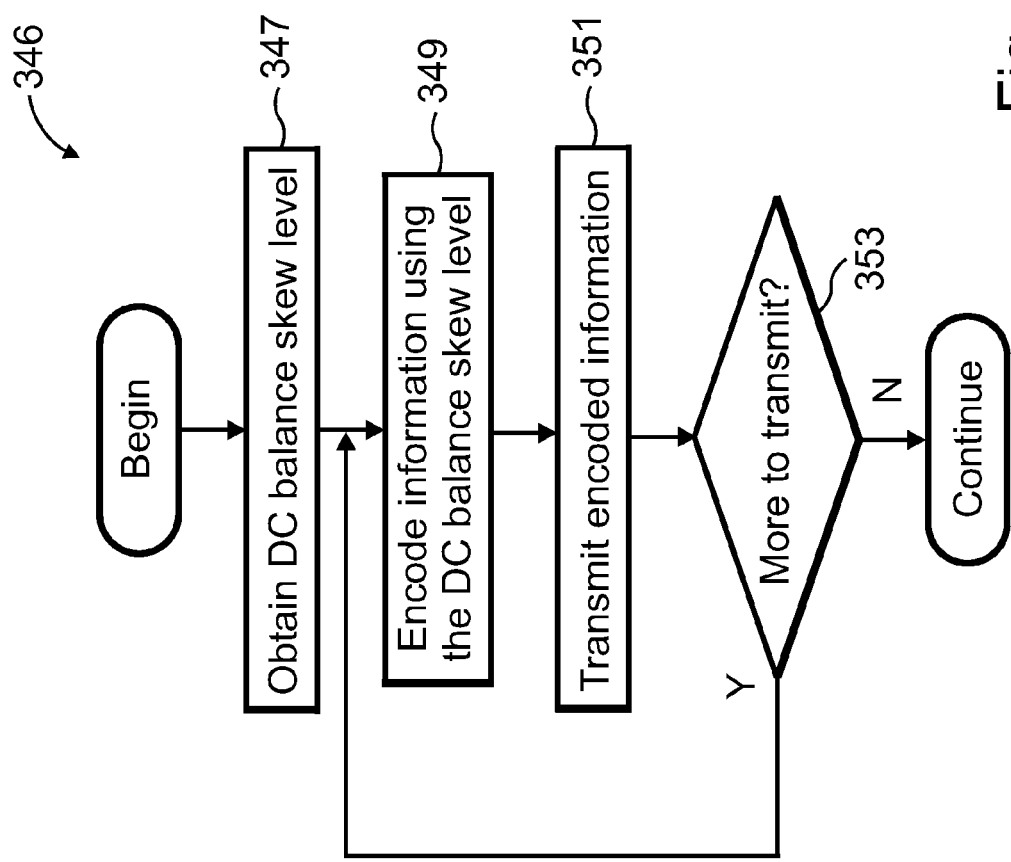
FIG. 9 shows a flow diagram of a method according to another illustrative embodiment for using DC balance skew.

FIG. 9 shows an example of a flow diagram 346 for such a technique. At 347, a preset or pre-determined or desired level of DC balance skew is obtained. At 349, information is encoded using the DC balance skew level. At 351, the encoded information is transmitted via a link or channel. At 353, a determination is made whether additional information exists for transmission or whether further communication is desired. If so, control returns to 349. Otherwise, communication ends.

Figure 10:
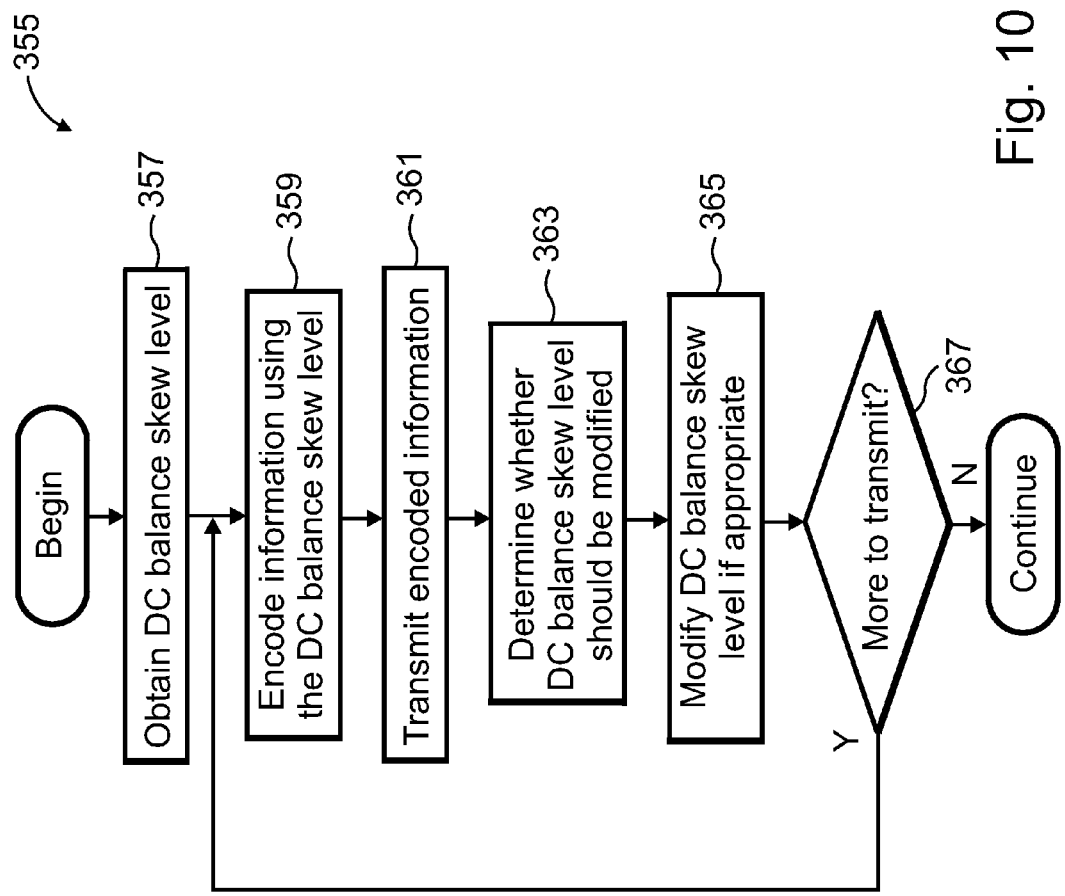
FIG. 10 illustrates a flow diagram of a method according to yet another illustrative embodiment for using DC balance skew.

Note that one may combine a preset or pre-determined DC balance skew level with an adaptive or feedback-based scheme that modifies the preset or pre-determined DC balance skew level. FIG. 10 shows an example of a flow diagram 355 for such a technique.

At 357, a preset or pre-determined or desired level of DC balance skew is obtained. At 359, information is encoded using that DC balance skew level. At 361, the encoded information is transmitted via a link or channel.

At 363, a determination is made whether the DC balance skew level should be modified. The determination may be made in a number of ways, for instance, using the techniques described above. For example, in some embodiments, the determination may be using BER figures or estimates, as described above. As another example, in some embodiments, the determination may be made by monitoring characteristics of the communication or feedback from the receiver or receiving transceiver, for instance, the number or frequency of requests for re-transmitting information.

Depending on the result of the determination at 363, at 365 the DC balance skew level is modified if appropriate. In other words, if a determination is made that the DC balance skew level should be modified, the DC balance skew level is updated, modified, changed, etc. Otherwise, the existing DC balance skew level (e.g., the preset or pre-determined level from 357, as modified, if any) may be used.

At 353, a determination is made whether additional information exists for transmission or whether further communication is desired. If so, control returns to 349. Otherwise, communication ends.

According to one aspect of the disclosure, DC balance skew may be combined with other techniques to improve or enhance information or data communication. An example constitutes pre-emphasis and equalization or adjustments in the VOD. Thus, in some embodiments, a transmitter (or transceiver) may use pre-emphasis together with DC balance skew by using, for example, an arrangement as shown in FIG. 4A. A corresponding receiver may then use equalization by using, for example, an arrangement as shown in FIG. 4B.

For example, given a communication link, experimentation has shown that, depending on how the transmit pre-emphasis settings are set, it is possible to improve the link quality by an order of magnitude or two orders of magnitude by introducing a slight DC imbalance or skew. In one case, a BER of 50 per minute was found with a DC-balanced link, and an error rate of 0 or 1 per minute was found with a DC-balance in the range of −1.4% to −3.3%. This type of improvement has been found when the pre-emphasis was set to a relatively high level (higher than typically used for the link), or when the pre-emphasis was set appropriately or normally for the link, but the VOD was set to a relatively high level.

A variety of techniques and/or circuits may be used to introduce or apply DC balance skew. The DC imbalance or DC balance skew may be set, for example, by using a modified rule with 64/67 or other encodings that switch between a representation or encoding that provides a positive disparity on an existing word and a representation that provides negative disparity on an existing word. Note that, as long as the receiver has the ability to accept positive and negatively biased words, the receiver does not intrinsically need to be aware of the transmitter's algorithm or technique for sending one type of word versus the other.

In some embodiments, the transmitter can keep track of the running disparity as well as the number of bits sent, and choose to send one extra negatively encoded word at given or desired intervals, for example, every 100 words (or other desired number).

Figure 11:
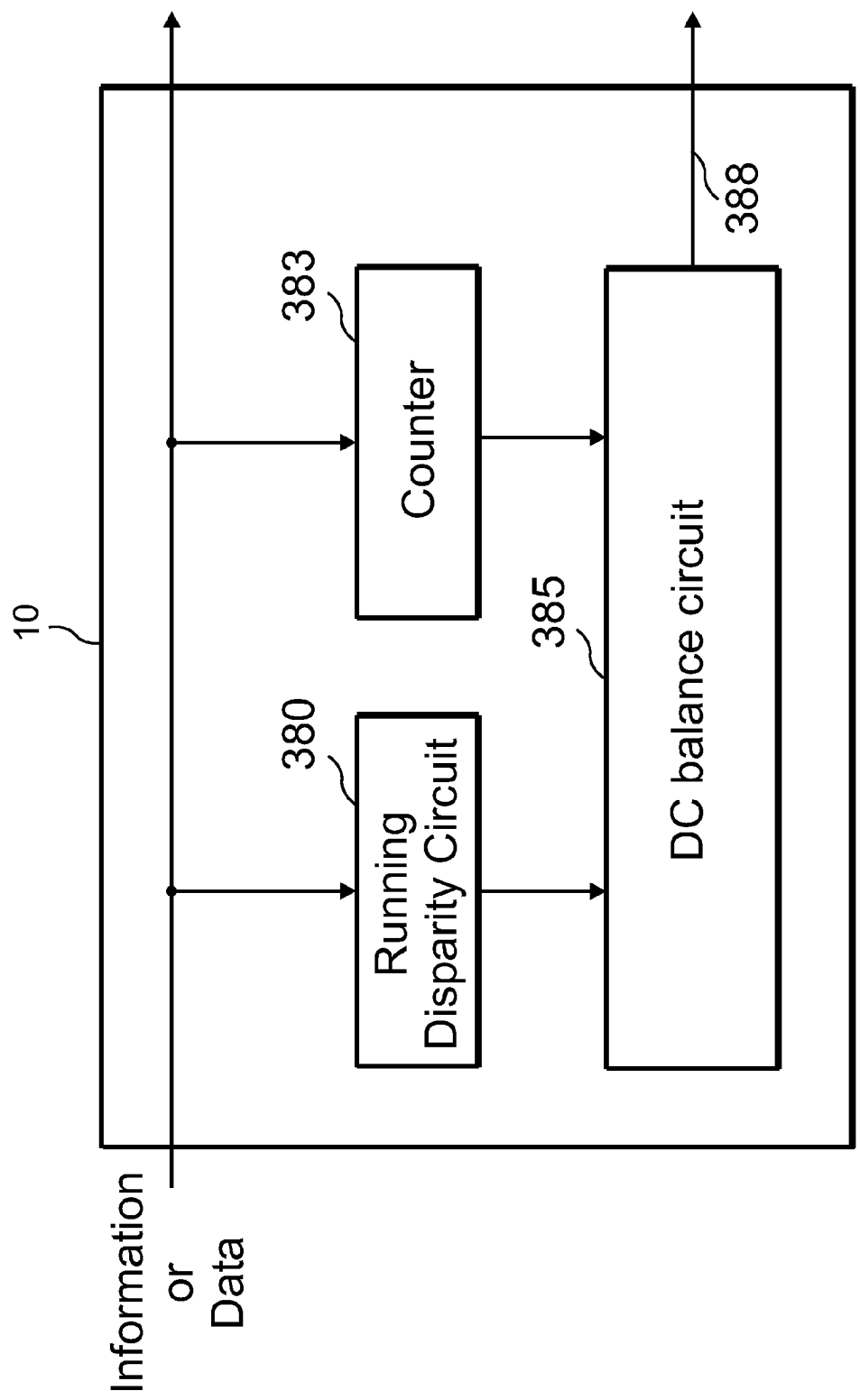
FIG. 11 depicts a block diagram of an arrangement for generating DC balance skew according to an exemplary embodiment.

FIG. 11 shows a block diagram of a DC balance skew generator 10 that uses such a technique.

DC balance skew generator 10 includes a running disparity circuit 380, counter 383, and DC balance circuit 385. Running disparity circuit 380 is coupled to receive the information or data that ultimately (whether further processed or not) is transmitted to the communication link or channel. Running disparity circuit 380 tracks and stores (e.g., using a register) the running disparity of the information, and provides the running disparity measure to DC balance circuit 385.

Counter 383 is also coupled to receive the information or data that ultimately (whether further processed or not) is transmitted to the communication link or channel. Counter 383 counts or keeps track of the number of bits of information, e.g., the number of bits transmitted, and provides the number to DC balance circuit 385.

DC balance circuit 385 uses the measure of running disparity and the number of bits to determine a suitable level of DC balance skew. In some embodiments, DC balance circuit 385 may use the determined level of DC balance skew to change the history of the link (e.g., by modifying the running disparity measure in running disparity circuit 380 and/or the number of bits in counter 383. By changing the history of the link in this manner, DC balance circuit 385 causes the information to be encoded such that the determined or desired level of DC balance skew is obtained.

In some embodiments, DC balance circuit 385 may provide the determined level of DC balance skew to other circuitry in the transmitter or transceiver. For example, DC balance circuit 385 may provide the determined level of DC balance skew to encoders (see, for example, FIG. 4A) or other circuitry. The encoders or other circuitry then uses the information from DC balance circuit 385 to modify the operation of the transmitter or transceiver so that the determined or desired level of DC balance skew is obtained.

As noted above, transmitters or transceivers according to the disclosure may be incorporated, integrated, or included in a variety of ICs, as desired. One type or class of IC includes field programmable gate arrays (FPGAs). Some FPGAs include transmitters or transceivers for communication with other electronic circuitry. By virtue of their programmable resources, the inclusion of the transmitters/transceivers provides a flexible platform for implementing arbitrary designs that the FPGA user wishes to implement.

Figure 12:
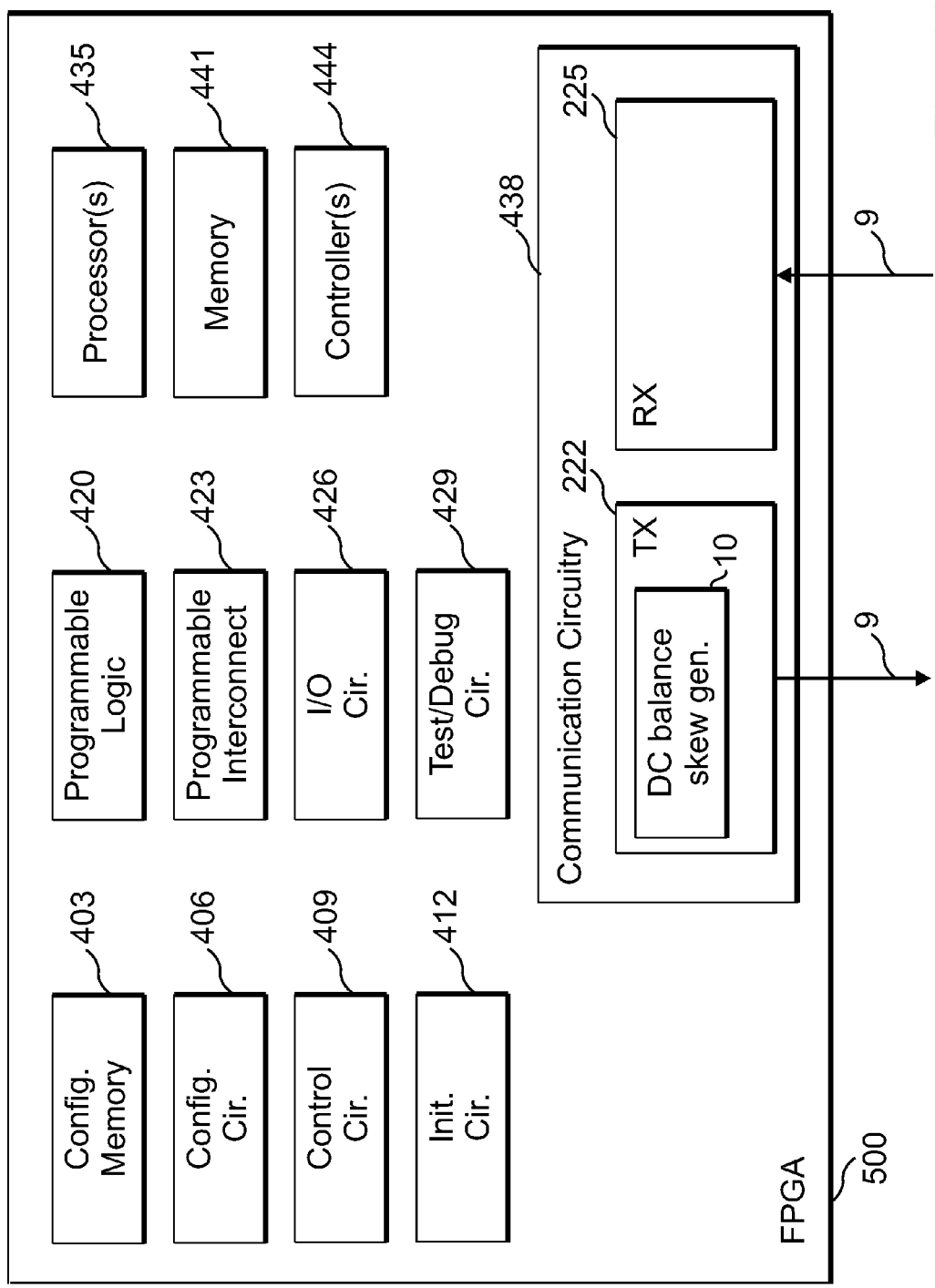
FIG. 12 shows a block diagram of a field programmable gate array (FPGA) that uses DC balance skew according to an exemplary embodiment.

FIG. 12 shows a block diagram of an FPGA 500 that uses DC balance skew according to an exemplary embodiment. FPGA 500 includes configuration memory (CRAM) 403, configuration circuitry 406, control circuitry 409, programmable logic 420, programmable interconnect 423, and I/O circuitry 426.

In addition, FPGA 500 may include test/debug circuitry 429, one or more processors 435, one or more communication circuitry 438, one or more memories 441, one or more controllers 444, and initialization circuit 412, as desired.

Note that the figure shows a simplified block diagram of FPGA 500. Thus, FPGA 500 may include other blocks and circuitry, as persons of ordinary skill in the art understand. Examples of such circuitry include signal and/or clock generation and distribution circuits, redundancy circuits, and the like.

Programmable logic 420 includes blocks of configurable or programmable logic circuitry, such as look-up tables (LUTs), product-term logic, multiplexers (MUXs), logic gates, registers, memory, and the like. Programmable interconnect 423 couples to programmable logic 420 and provides configurable interconnects (coupling mechanisms) between various blocks within programmable logic 420 and other circuitry within or outside FPGA 500.

Control circuitry 409 controls various operations within FPGA 500. Under the supervision of control circuitry 409, FPGA configuration circuitry 406 uses configuration data (which it obtains from an external source, such as a storage device, a host, etc.) to program or configure the functionality of FPGA 500. Configuration data are typically stored in CRAM 403. The contents of CRAM 403 determine the functionality of various blocks of FPGA 500, such as programmable logic 420 and programmable interconnect 423, and/or communication circuitry 438 (e.g., the level of DC balance skew). Initialization circuit 412 may cause the performance of various functions at reset or power-up of FPGA 500.

I/O circuitry 426 may constitute a wide variety of I/O devices or circuits, as persons of ordinary skill in the art understand. I/O circuitry 426 may couple to various parts of FPGA 500, for example, programmable logic 420 and programmable interconnect 423. I/O circuitry 426 provides a mechanism and circuitry for various blocks within FPGA 500 to communicate with external circuitry or devices.

Test/debug circuitry 429 facilitates the testing and troubleshooting of various blocks and circuits within FPGA 500. Test/debug circuitry 429 may include a variety of blocks or circuits known to persons of ordinary skill in the art. For example, test/debug circuitry 429 may include circuits for performing tests after FPGA 500 powers up or resets, as desired. Test/debug circuitry 429 may also include coding and parity circuits, as desired.

FPGA 500 may include one or more processors 435. Processor 435 may couple to other blocks and circuits within FPGA 500. Processor 435 may receive data and information from circuits within or external to FPGA 500 and process the information in a wide variety of ways, as persons skilled in the art appreciate. One or more of processor(s) 435 may constitute a digital signal processor (DSP). DSPs allow performing a wide variety of signal processing tasks, such as compression, decompression, audio processing, video processing, filtering, and the like, as desired.

FPGA 500 may further include one or more memories 441 and one or more controller(s) 444. Memory 441 allows the storage of various data and information (such as user-data, intermediate results, calculation results, etc.) within FPGA 500. Memory 441 may have a granular or block form, as desired. Controller 444 allows interfacing to, and controlling the operation and various functions of circuitry outside the FPGA. For example, controller 444 may constitute a memory controller that interfaces to and controls an external synchronous dynamic random access memory (SDRAM), as desired.

As noted, FPGA 500 may also include one or more communication circuits 438. Communication circuit(s) 438 may facilitate data and information exchange between various circuits within FPGA 500 and circuits external to FPGA 500, as persons of ordinary skill in the art understand.

More specifically, communication circuit 438 may include transmitter 222 and receiver 225 (or a transceiver, as described above). Receiver 225 can receive information from sources internal to FPGA 500 or from sources external to FPGA 500 via link 9 (or part of link 9 used for receiving information). In some embodiments, receiver 225 may have the form or topology shown in FIG. 4B.

Referring to FIG. 12, transmitter 222 can transmit information to sources internal to FPGA 500 or to sources external to FPGA 500 via link 9 (or part of link 9 used for transmitting information). Transmitter 222 includes DC balance skew generator 10, as described above. Transmitter 222 uses DC balance skew generator 10 to improve communication via link 9, as described above in detail. In some embodiments, transmitter 222 may have the form or topology shown in FIG. 4A.

As noted above, although the above description concerns in parts the application of the disclosed concepts to FPGAs, one may apply the disclosed concepts to a variety of other electronic circuits and devices, by making modifications that fall within the knowledge of persons of ordinary skill in the art who have the benefit of the description of the disclosed concepts. Some examples of such devices include custom, standard-cell, gate-array, programmable logic device (PLD), complex PLD (CPLD), application specific integrated circuit (ASIC), and structured ASICs.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to those described here will be apparent to persons of ordinary skill in the art. Accordingly, this description teaches those skilled in the art the manner of carrying out the disclosed concepts, and is to be construed as illustrative only.

The forms and embodiments shown and described should be taken as illustrative embodiments. Persons skilled in the art may make various changes in the shape, size and arrangement of parts without departing from the scope of the disclosed concepts in this document. For example, persons skilled in the art may substitute equivalent elements for the elements illustrated and described here. Moreover, persons skilled in the art who have the benefit of this disclosure may use certain features of the disclosed concepts independently of the use of other features, without departing from the scope of the disclosed concepts.

The invention claimed is:

1. An apparatus, comprising a transmitter adapted to transmit encoded information to a communication link, the transmitter comprising a DC balance skew generator, the DC balance skew generator adapted to skew a DC balance of the information before the information is provided to the communication link.

2. The apparatus according to claim 1, wherein the DC balance skew generator skews the DC balance of the information according to a preset level.

3. The apparatus according to claim 2, wherein the DC balance skew generator further skews the DC balance of the information from the preset level.

4. The apparatus according to claim 1, wherein the DC balance skew generator skews the DC balance of the information adaptively.

5. The apparatus according to claim 4, wherein the DC balance skew generator skews the DC balance of the information based on a bit error rate (BER).

6. The apparatus according to claim 1, further comprising a receiver adapted to receive information from the communication link.

7. The apparatus according to claim 6, wherein the DC balance skew generator skews the DC balance of the information based on information about the communication link.

8. The apparatus according to claim 6, wherein the DC balance skew generator skews the DC balance of the information based on a frequency of re-transmission requests by the receiver.

9. The apparatus according to claim 6, wherein the transmitter applies pre-emphasis to the information before providing the information to the communication link.

10. The apparatus according to claim 9, wherein the receiver applies equalization to the information received from the communication link.

11. A method of communicating information, the method comprising:
obtaining the information;
adding DC balance skew to the information; and
transmitting the information via a communication link.

12. The method according to claim 11, wherein adding DC balance skew to the information further comprises skewing the DC balance of the information according to a preset level.

13. The method according to claim 12, wherein adding DC balance skew to the information further comprises skewing the DC balance of the information from the preset level.

14. The method according to claim 11, wherein adding DC balance skew to the information further comprises skewing the DC balance of the information adaptively.

15. The method according to claim 14, wherein adding DC balance skew to the information further comprises skewing the DC balance of the information based on a bit error rate (BER).

16. The method according to claim 11, wherein adding DC balance skew to the information further comprises skewing the DC balance of the information based on information about the communication link.

17. The method according to claim 11, further comprising using a receiver to receive information from the communication link.

18. The method according to claim 17, wherein adding DC balance skew to the information further comprises skewing the DC balance of the information based on a frequency of re-transmission requests by the receiver.

19. The method according to claim 17, further comprising applying equalization to the information received from the communication link.

20. The method according to claim 11, further comprising applying pre-emphasis to the information before transmitting the information via a communication link.

* * * * *